June 9, 1953 W. G. SNYDER 2,641,018
HINGE JOINT
Filed Aug. 16, 1950
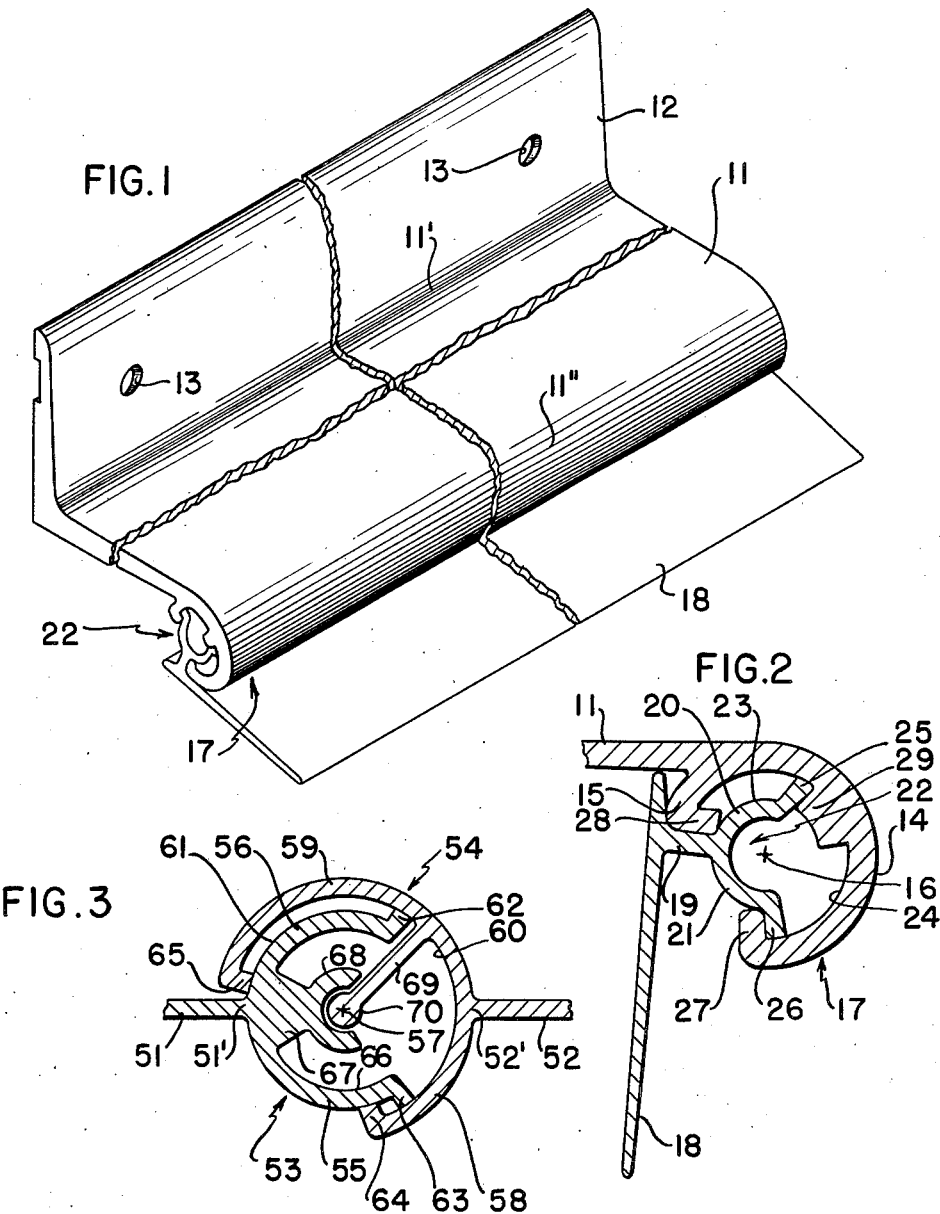
INVENTOR.
Willard G. Snyder
BY
W. Lee Helms
ATTORNEY Patented June 9, 1953

2,641,018

UNITED STATES PATENT OFFICE 2,641,018

HINGE JOINT

Willard G. Snyder, Louisville, Ky., assignor to Reynolds Metals Company, Richmond, Va., a corporation of Delaware Application August 16, 1950, Serial No. 179,760

3 Claims. (Cl. 16—178)

This invention relates to hinge-type joints, and more particularly to a joint formed of two longitudinal relatively pivotable hinge members specially constructed for fabrication by extrusion processes.

The advantages of low manufacturing costs and high quality product obtained in the fabrication of metallic articles by means of extrusion are too well-known to require elaboration. However, in order to utilize this mode of production, the articles must be of a configuration that permits of extrusion and it is usually quite difficult to devise a configuration and construction both capable of being extended and also durable and functionally efficient.

It is therefore a primary object of the present invention to provide an inexpensive, strong and efficient hinge-type joint formed of two relatively pivotable elements which are easily assembled and are ideally suited for fabrication by well-known extrusion processes. Other objects reside in the specific novel structural details of the joint, which details provide advantages in the manufacture, assembly and functioning of the joint.

Briefly described, the hinge joint embodying the present invention is formed of two segments having cylindrical hinge surfaces coaxially mounted, one within the other, and relatively pivotable about the common axis. A plurality of radial sections or projections extend inwardly from the outer cylindrically shaped hinge member in sliding contact with the outer cylindrical surface of the inner hinge member, and similarly, the latter inner member is provided with a plurality of radial projections extending outwardly and in sliding contact with the inner cylindrical surface of the outer hinge member, thereby providing for the relative pivotable mounting of the hinge members. The projections, of each hinge member coact with the projections of the other hinge member to provide a stop or abutment limiting the relative pivotal movement of the hinge members. Both hinge members may in another modification be integrally provided on their interior surfaces with radial portions extending inwardly and forming at their inner ends coacting ball and socket bearing elements.

The hinge-type joint of the present invention may be utilized in the construction of awnings, shutters, or in any other application where two members are to be pivotally secured with respect to each other.

It is to be understood that the specific embodiments of the invention shown in the drawing and described herein are merely illustrative of two of the many forms which the invention may take in practice, and are not to limit the scope of the invention, which is delineated in the appended claims.

In the drawings:

Fig. 1 is a perspective view of one form of the hinge-type joint;

Fig. 2 is a transverse sectional view of the embodiment of the invention illustrated in Fig. 1, the second pivotable member thereof being shown in a different position; and Fig. 3 is a transverse sectional view of a second and preferred form of the invention.

Referring now to Figures 1 and 2 of the drawing, wherein is illustrated one form or modification of the invention, the reference numeral 11 indicates generally a flat or planar member having along one longitudinal edge 11' a bracket or plate 12 integral therewith and extending perpendicular thereto. The bracket 12 is provided with apertures 13 or other suitable means for fixedly securing the member 11 to a frame, window sash, shutter, or any other type of structural element. The opposite longitudinal edge 11'' of the planar member 11 has integrally formed therewith a pair of spaced arcuate oppositely disposed portions 14, 15. The latter are curved about a longitudinal axis, indicated at 16, so as to form a segment having a cylindrical hinge member 17 extending along the longitudinal edge 11'' of the planar member 11.

A second flat or planar member 18 is provided and is adapted to be secured by any suitable means to another structural element (not shown) which is to be pivotally secured by means of the invention to the element on which the bracket 12 is mounted. A section 19 is integral with the member 18 and extends perpendicularly therefrom toward the axis 16. A pair of spaced oppositely disposed arcuate portions 20, 21 are formed integral with the inner edge of the section 19. The arcuate portions 20, 21 are curved about the longitudinal axis 16 so as to form a second segment having a cylindrical hinge member 22 within the hinge member 17.

As will be evident from Fig. 2, the hinge members 17 and 22 are coaxial or concentric about the axis 16. The outer cylindrical surface 23 of the inner hinge member 22 is spaced radially inwardly from the inner cylindrical surface 24 of the outer hinge member 17. The edges of the arcuate portions 20 and 21 form the interior of hinge member 22 and are provided with integral sections or projections 25, 26 extending outwardly toward and in substantial abutting contact with the inner cylindrical surface 24 of the outer hinge member 17. Sections or projections 27, 28 are similarly integral with the edges of the arcuate portions 14 and 15 form the outer hinge member 17 and extend inwardly into contact with the outer cylindrical surface 23 of the inner hinge member 22. The inner surface 24 of outer hinge member 17 is also provided with an integral projection 29 extending radially inwardly toward the axis 16.

The contact between the ends of the projections 25, 26, 27, 28 and the respective cylindrical surfaces 23, 24 is of a sliding nature so as to act as a bearing means for rotatably mounting the hinge members 17 and 22 for relative pivotal movement about the longitudinal axis 16. The projections 25, 26, 27, and 28 also coact with the section 19 and projection 29 so as to limit the relative pivotal movement of hinge members 17, 22 in either direction of rotation. Referring to Fig. 2, wherein is shown one extreme relative position of the hinge members 17, 22, it will be seen that projection 28 is abutting section 19, projection 29 is abutting projection 25, and projection 27 is abutting projection 26 so as to prevent continued clockwise rotation of the inner hinge member 22 with respect to the outer hinge member 17. The inner hinge member 22 may be pivoted counter-clockwise with respect to the outer hinge member 17 until the other extreme limiting position is reached, when section 19 abuts projection 27, projection 26 abuts projection 29 and projection 25 abuts projection 28.

It will be understood that the entire structure shown in section in Fig. 2 extends longitudinally of and parallel to the axis 16 so as to provide an elongated hinge-type joint consisting of two relatively pivotal integral members each having a cross-section uniform throughout its length so as to be capable of being fabricated by an extrusion process. The two integral members or segments, each having a cylindrical hinge member and a planar member, may be quickly and easily assembled by merely sliding the inner hinge member 22 into the outer hinge member 17.

Referring now to Fig. 3, wherein is shown a preferred form of the invention, the reference numerals 51, 52 indicate two planar members equivalent to members 11, 18 of the above-described modification of Figs. 1 and 2. A longitudinal cylindrical hinge member is integrally formed along each of the longitudinal edges 51', 52' of planar members 51, 52, the two hinge members being indicated at 53 and 54 respectively. The hinge member 53 is formed of two spaced oppositely-disposed arcuate portions 55, 56 curved about a longitudinal axis indicated at 57. The hinge member 54 is also provided with similar arcuate portions 58, 59 curved about the axis 57 and extending around the arcuate portions 55, 56 whereby the outer hinge member 54 is coaxial with and partially encloses the inner hinge member 53.

The inner cylindrical surface 60 of the outer hinge member 54 is spaced radially outwardly from the outer cylindrical surface of the inner hinge member 53. The arcuate portions 55, 56 of the latter are integrally provided at their edges with sections or projections 62, 63 extending outwardly toward and into abutting contact with the inner cylindrical surface 60 of the outer hinge member 54 and the arcuate portions 58, 59 of the latter are similarly provided with sections or projections 64, 65 extending inwardly and into abutting contact with the exterior cylindrical surface 61 of the inner hinge member 53. The projections 62, 63, 64, 65 are slidable with respect to the surfaces 60, 61 whereby the two hinge members 53, 54 are relatively rotatable about the common axis 57.

The interior cylindrical surface 66 of the inner hinge member 53 has integral therewith a radial portion 67 extending inwardly toward the axis 57. The inner edge of the radial portion 67 is provided with a cylindrically shaped bearing 68 coaxial with the hinge members 53, 54. The interior surface 60 of the outer hinge member 54 has integral therewith a second radial portion 69 extending inwardly toward the axis 57. The inner edge of the radial portion 69 has a longitudinal rounded rib or male bearing element 70 rotatably mounted within the cylindrically shaped bearing 68. It will thus be obvious that the bearing 68 and rounded rib 70 coact to provide a bearing means additional to projections 62, 63, 64, 65 and surfaces 60, 61 for mounting the hinge members 53, 54 for relative pivotal movement.

The radial portion 69 is adapted to abut against the projections 62, 63 and the planar member 51 and projections 64, 65 may also abut so as to limit the relative pivotal movement of the hinge members 53, 54. It will be understood that the sections shown in Fig. 3 are uniform and constant throughout the length of the joint so as to provide two integral longitudinal parts adapted to be fabricated by extrusion and assembled by sliding the inner hinge member 53 into and longitudinally of the outer hinge member 54.

Having described my invention, what I claim and desire to secure by Letters Patent is as follows:

1. The hinge prepared from two extruded segments comprising a first segment having a first planar member merged with a first cylindrically shaped member having a plurality of inwardly disposed projections, a second segment having a second planar member merged with a second cylindrically shaped member having a plurality of outwardly disposed projections, the said second cylindrically shaped member being slidably disposed within said first cylindrically shaped member, said outwardly disposed projections of the inner cylindrical member being located among said inwardly disposed projections of said first cylindrically shaped member.

2. The hinge of claim 1 wherein the second segment has its second planar member merged to the said second cylindrically shaped member by an integral bridging member disposed substantially at right angles to said second planar member.

3. A hinge prepared from two extruded segments comprising a first segment having a first planar member merged with a first cylindrically shaped member having a plurality of inwardly disposed projections, and a second segment having a second planar member merged with a second cylindrically shaped member having a plurality of outwardly disposed projections, said planar members of said first and second cylindrically shaped members being disposed exteriorly of said members and substantially perpendicular thereto, one of said projections of said first segment being radially disposed to the center of the cylinder and provided with a cylindrical ball-like surface, the second cylindrically shaped member having one of its projections provided with a curvatured depression adapted to receive said ball-like surface of said radially disposed projection.

WILLARD G. SNYDER.

References Cited in the file of this patent

UNITED STATES PATENTS

| Number | Name | Date |
|---|---|---|
| 470,334 | Karo | Mar. 8, 1892 |
| 1,486,371 | Forbes | Mar. 11, 1924 |
| 1,659,305 | Vance | Feb. 14, 1928 |
| 2,302,661 | Benson | Nov. 24, 1942 |

FOREIGN PATENTS

| Number | Country | Date |
|---|---|---|
| 588,493 | Germany | Nov. 24, 1933 |